United States Patent
Van Riel et al.

(10) Patent No.: US 10,969,976 B2
(45) Date of Patent: **\*Apr. 6, 2021**

(54) FAST VIRTUAL MACHINE STORAGE ALLOCATION WITH ENCRYPTED STORAGE

(71) Applicant: Red Hat, Inc., Raleigh, NC (US)

(72) Inventors: Henri Han Van Riel, Concord, NH (US); Nitesh Narayan Lal, Boston, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,021

(22) Filed: Nov. 11, 2019

(65) Prior Publication Data

US 2020/0081639 A1 Mar. 12, 2020

Related U.S. Application Data

(63) Continuation of application No. 15/829,603, filed on Dec. 1, 2017, now Pat. No. 10,474,382.

(51) Int. Cl.
*G06F 12/00* (2006.01)
*G06F 13/00* (2006.01)
(Continued)

(52) U.S. Cl.
CPC .......... *G06F 3/0631* (2013.01); *G06F 3/0604* (2013.01); *G06F 3/0643* (2013.01);
(Continued)

(58) Field of Classification Search
CPC ......... G06F 3/0631; G06F 2009/45583; G06F 12/0246
(Continued)

(56) References Cited

U.S. PATENT DOCUMENTS 6,598,143 B1   7/2003   Baker et al.
7,337,296 B2   2/2008   Noel et al.
(Continued)

OTHER PUBLICATIONS

"Bug 995420—Qemu-Kvm Process do not Release Memory(RES) after Guest Do Stress Test", 2013, https://bugzilla.redhat.com/show_bug_cgi?id=995420/, 3 pages.
(Continued)

*Primary Examiner* — Edward J Dudek, Jr.
*Assistant Examiner* — Sidney Li
(74) *Attorney, Agent, or Firm* — Lowenstein Sandler LLP

(57) ABSTRACT

Systems and methods for fast storage allocation for encrypted storage are disclosed. An example method may include receiving, by a processing device executing an operating system, an identification of a first storage block that has been released by a first virtual machine; tracking, by the operating system, an encryption status corresponding to the first storage block to indicate whether the first storage block contains encrypted content; receiving a request to allocate storage to a second virtual machine; analyzing, by the operating system, the first storage block to determine that the first storage block contains encrypted content in view of the encryption status corresponding the first storage block; and allocating the first storage block containing the encrypted content to the second virtual machine without clearing the encrypted content of the first storage block.

20 Claims, 5 Drawing Sheets

(51) Int. Cl.
*G06F 13/28* (2006.01)
*G06F 3/06* (2006.01)
*G06F 9/455* (2018.01)
*G06F 12/02* (2006.01)

(52) U.S. Cl.
CPC .......... *G06F 3/0664* (2013.01); *G06F 3/0683* (2013.01); *G06F 9/45558* (2013.01); *G06F 12/0246* (2013.01); *G06F 2009/45579* (2013.01); *G06F 2009/45583* (2013.01)

(58) Field of Classification Search
USPC ........................................................ 711/170
See application file for complete search history.

(56) References Cited

U.S. PATENT DOCUMENTS

| | | |
|---|---|---|
| 7,433,951 B1 | 10/2008 | Waldspurger |
| 7,516,292 B2 | 4/2009 | Kimura |
| 8,086,811 B2 | 12/2011 | Gainey, Jr. |
| 8,255,658 B2 | 8/2012 | Adachi |
| 8,583,875 B1 | 11/2013 | Garthwaite et al. |
| 8,667,496 B2 | 3/2014 | Levin |
| 8,689,007 B2 | 4/2014 | Schunter et al. |
| 8,789,034 B1 | 7/2014 | Emelyanov et al. |
| 8,856,194 B2 | 10/2014 | Chen et al. |
| 8,875,295 B2 | 10/2014 | Lutas et al. |
| 8,943,259 B2 | 1/2015 | Weissman et al. |
| 9,069,782 B2 | 6/2015 | Yang et al. |
| 9,147,078 B2 | 9/2015 | Muff et al. |
| 9,183,157 B2 | 11/2015 | Qiu et al. |
| 9,201,682 B2 | 12/2015 | Cheng et al. |
| 9,251,090 B1 | 2/2016 | Borthakur et al. |
| 9,268,678 B2 | 2/2016 | Tuch et al. |
| 9,280,458 B2 | 3/2016 | Durrant |
| 9,280,486 B2 | 3/2016 | van Riel |
| 9,298,377 B2 | 3/2016 | Baskakov et al. |
| 9,355,023 B2 | 5/2016 | Badam et al. |
| 9,361,218 B2 | 6/2016 | Ahmad et al. |
| 9,390,028 B2 | 7/2016 | Gordon et al. |
| 9,442,754 B1 | 9/2016 | Tsirkin |
| 9,448,928 B2 | 9/2016 | Ahad et al. |
| 9,459,900 B2 | 10/2016 | Tsirkin |
| 9,507,540 B1 | 11/2016 | Adogla et al. |
| 9,509,501 B2 | 11/2016 | Bursell |
| 9,524,233 B2 | 12/2016 | Venkatasubramanian et al. |
| 9,552,233 B1 | 1/2017 | Tsirkin et al. |
| 9,619,263 B2 | 4/2017 | Broas |
| 9,672,062 B1 | 6/2017 | Tsirkin et al. |
| 10,083,058 B2 | 9/2018 | Tsirkin |
| 2007/0016904 A1 | 1/2007 | Adlung et al. |
| 2008/0307188 A1 | 12/2008 | Franaszek et al. |
| 2009/0307447 A1 | 12/2009 | Jacobs et al. |
| 2010/0070678 A1 | 3/2010 | Zhang et al. |
| 2010/0095074 A1 | 4/2010 | Ganesh |
| 2010/0169536 A1 | 7/2010 | Shedel et al. |
| 2010/0325268 A1 | 12/2010 | Muthiah |
| 2011/0154133 A1 | 6/2011 | Ganti et al. |
| 2011/0246767 A1* | 10/2011 | Chaturvedi ............. G06F 21/53 713/164 |
| 2011/0320682 A1 | 12/2011 | McDougal et al. |
| 2012/0079479 A1 | 3/2012 | Hakewill |
| 2012/0239850 A1 | 9/2012 | Qiu et al. |
| 2012/0317331 A1 | 12/2012 | Broas |
| 2013/0145073 A1 | 6/2013 | Tuch |
| 2013/0339568 A1 | 12/2013 | Corrie |
| 2015/0039838 A1 | 2/2015 | Tarasuk-Levin et al. |
| 2015/0089010 A1 | 3/2015 | Tsirkin |
| 2015/0199209 A1 | 7/2015 | Tsirkin |
| 2015/0242159 A1 | 8/2015 | Tsirkin |
| 2015/0301946 A1 | 10/2015 | Guo et al. |
| 2016/0077965 A1 | 3/2016 | Gaonkar et al. |
| 2016/0078585 A1 | 3/2016 | Sheldon et al. |
| 2016/0085695 A1 | 3/2016 | Leslie-Hurd et al. |
| 2016/0253201 A1 | 9/2016 | Zhang et al. |
| 2016/0350236 A1 | 12/2016 | Tsirkin et al. |
| 2016/0350244 A1 | 12/2016 | Tsirkin et al. |
| 2017/0108914 A1 | 4/2017 | Chun et al. |
| 2017/0206175 A1 | 7/2017 | Sliwa et al. |
| 2018/0095899 A1* | 4/2018 | Durham ............. G06F 12/1408 |

OTHER PUBLICATIONS

Riel, Rik van, "Guest Memory Overcommit—Page Hinting, Resizing & More", Red Hat, 2011, http://www.linux-kvm.irg/images/f/ff/2011-forum-memory-overcommit.pdf, 14 pages.

"8.2. Memory Tuning on Virtual Machines", https://access.redhat.com/documentation/en-US/Red_Hat_Enterprise_Linux/7/html/Virtualization_Tuning_and_Optimization_Guide/sect-Virtualization_Tuning_Optimization_Guide-Memory-Tuning.html, 6 pages.

Agarwal, Neha & Wenisch, Thomas F., "Thermostat: Application-transparent Page Management for Two-tiered flain Memory", Apr. 12, 2017, University of Michigan, http://web.eecs.umich.edu/~twenisch/papers/asplos17.pdf, 14 pages.

Huang, Jian, Qureshi, Moinuddin K., Schwan, Karsten, "An Evolutionary Study of Linux Memory Management for zun and Profit", Jun. 24, 2016, Georgia Institute of Technology, https://www.usenix.org/system/files/conference/atc16/itc16_paper-huang.pdf, 15 pages.

Stephen J. Bigelow, "How Hypervisors Dynamically Allocate Memory to Improve VM Performance", Search Server Virtualization, Jun. 2013, 10 pages.

Jisoo Yang et al., "Using Hypervisor to Provide Data Secrecy for User Applications on a Per-Page Basis", University of Michigan, Mar. 5, 2008, 10 pages.

Felicitas Hetzelt et al., "Security Analysis of Encrypted Virtual Machines", Cornell University Library, Dec. 4, 2016, 3 pages.

Riel, Rik van. "Re: [patch: 0/6] Guest page hinting". Posted Mar. 27, 2009. <https://1kml.Org/lkml/2009/3/27/503> and https ://lkml.org/lkml/2009/3/27 /503> in thread <https:/ /lkml.org/lkm 1/2009/ 3/27 /223>.

Corbet. "Guest page hinting". Posted Sep. 6, 2006. <http://lwn.net/Articles/198380/>. Comment posted by rvdheij on Sep. 14, 2006.

Waldspurger, C.A, "Memory Resource Management in VMware ESX Server," Proceedings of the 5th Symposium on Operating Systems Design and Implementation, Boston, Massachusetts, Dec. 9-11, 2002, 15 pages.

Scwidefsky, M. et al., "Collaborative Memory Management in Hosted Linux Environments," (IBM), Linux Symposium, Ottawa, Canada, Jul. 19-22, 2006,16 pages.

Van Riel. R., "KVM Performance Optimizations Internals," The Red Hat Summit, Boston, Massachusetts, May 5, 2011, 25 pages.

Corbet, J., "Linux Filesystem, Storage, and Memory Management Summit, Day 2," 2011 Linux Filesystem, Storage ind Memory Management Summit, San Francisco, California, Apr. 5, 2011, 9 pages.

"The Role of Memory in VMware ESX Server 3—Information Guide," VMware, Inc. Sep. 26, 2006, 11 pages.

Schwidefsky, M., "Linux Kernel Archive: [patch 0/6] [rfc] guest page hinting version 5" (May 11, 2007), downloaded in Jul. 28, 2011 from http://llkml indiana.edu/hypermail/linux/kemel/0705.1/21 01 html, 2 pages.

Schwidefsky, M., "Linux Kernel Archive: [patch 1/6] Guest page hinting: core+ volatile page cache," (Jun. 28, 2007), downloaded on Jul. 28, 2011 from http://comments.gmane.org/gmane.comp.emulators.kvm devel/4314,1 page.

Schwidefsky, M., "Linux Kernel Archive: [patch 2/6] Guest page hinting," (May 11, 2007), downloaded on Jul. 28, 2011 from http://llkml indiana.edu/hypermail/linux/kemel/0705. 1/2100html, 8 pages.

Schwidefsky, M., "Linux Kernel Archive: [patch 3/6] Guest page hinting: mlocked pages," (May 11, 2007), downloaded on Jul. 28, 2011 from http://llkml.indiana.edu/hypermail/linux/kemel/0705.1/21 02html, 3 pages.

Schwidefsky, M., "Linux Kernel Archive: [patch 4/6] Guest page hinting: writable page table entries," (May 11, 2007), downloaded on Jul. 28, 2011 from http://llkml.indiana.edu/hypermail/linux/kernel/0705.1/21 04html, 7 pages.

(56) References Cited

OTHER PUBLICATIONS

Schwidefsky, M., "Linux Kernel Archive: [patch 5/6] Guest page hinting: minor fault optimization," (May 11, 2007), downloaded on Jul. 28, 2011 from http://llkml.indiana.edu/hypermail/linux/kemel/0705.1/21 03htm1, 5 pages.

Schwidefsky, M., "Linux Kernel Archive: [patch 6/6] Guest page hinting: s390 support," (May 11, 2007), downloaded on Jul. 28, 2011 from http://lkml.indiana.edU/hypermail/linux/kernel/0705.1/21 05htm1, 14 pages.

Schwidefsky, M., "Guest page hinting: cover page." Published Sep. 6, 2006. <http://lwn.net/Articles/198384/>.

"Kernel Zeroes Memory?" Stack Overflow, 3 pages, downloaded from http://stackoverflow.com/questions/6004816/cernel-zeroes-memory on Sep. 1, 2016.

Hosterman, C. "Pure Storage FlashArray and Re-Examining VMware Virtual Disk Types," Cody Hosterman, IlashArray, VAAI, VMware, XCopy, Jul. 23, 2014, 9 pages, downloaded from http://www.codyhosterman.com/2014/07/pure-storage-flasharray-and-re-examining-vmware-virtual-disk-types/ on Sep. 1, 2016.

Chiang et al. "Working Set-based Physical Memory Ballooning," 10th International Conference on Autonomic Computing (ICAC '13), USENIX Association, pp. 95-99.

"Performance Best Practices for VMware vSphere® 5.5" VMware, Inc., Sep. 19, 2013, 90 pages.

Improving host swapping using adaptive prefetching and paging notifier; Chen, Wenzhi et al; Proceedings of the 19th ACM International Symposium on High Performance Distributed Computing; Jun. 21-25, 2010; pp. 300-303 (4 pages).

Denneman, Frank, "Impact of Memory Reservation", Decembers, 2009, http://frankdenneman.nl/2009/12/08/impact-of-memory-reservation,18 pages.

USPTO, Notice of Allowance for U.S. Appl. No. 15/829,603, dated Jun. 25, 2019.

USPTO, Office Action for U.S. Appl. No. 15/689,227, dated Apr. 1, 2019.

USPTO, Notice of Allowance for U.S. Appl. No. 15/689,227, dated Oct. 21, 2019.

\* cited by examiner

FAST VIRTUAL MACHINE STORAGE ALLOCATION WITH ENCRYPTED STORAGE

RELATED APPLICATIONS

The present application is a continuation of application Ser. No. 15/829,603, filed Dec. 1, 2017, entitled "FAST VIRTUAL MACHINE STORAGE ALLOCATION WITH ENCRYPTED STORAGE", which is incorporated by reference herein.

TECHNICAL FIELD

The present disclosure is generally related to virtualized computer systems, and more particularly, to fast storage allocation with encrypted memory.

BACKGROUND

In a virtualized environment, a host machine may allocate a certain amount of its storage resources to each of a plurality of virtual machines. Each virtual machine is then able to use the allocated storage resources to execute applications, including operating systems (referred to as guest operating systems). Executable code that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that the virtual machine has a contiguous address space, while in fact the memory used by the virtual machine may be physically fragmented and even overflow to disk storage. When the host machine frees memory, the host machine may select memory pages that have been assigned to virtual machines and page out the contents of the selected memory pages to disk storage. When the virtual machines attempt to access the memory pages, the host machine may page in the contents of the memory page by retrieving the contents from disk storage and writing the content back to memory.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
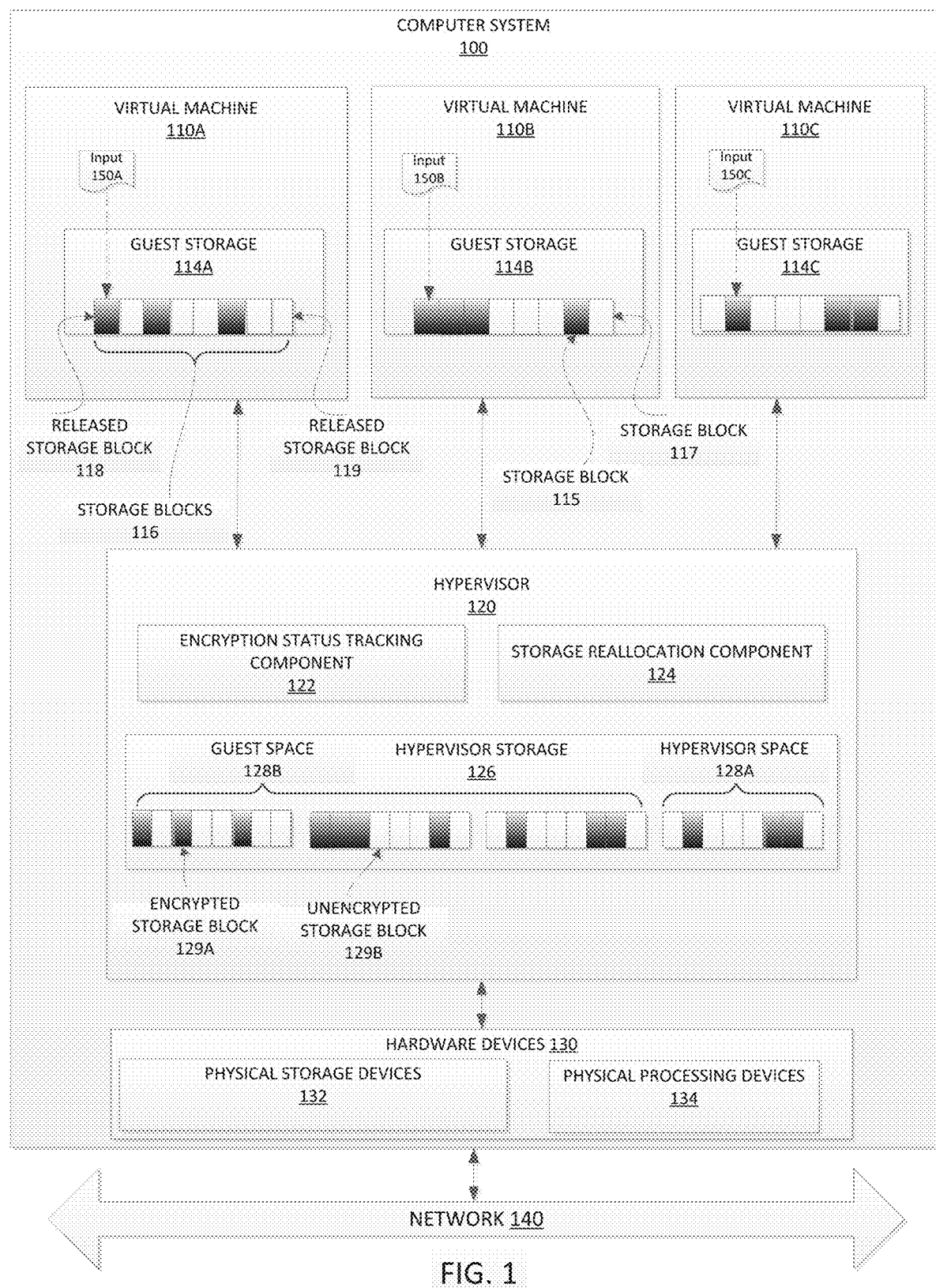
FIG. 1 depicts a high-level diagram of an example computer system in accordance with one or more aspects of the disclosure.

Described herein are methods and systems for performing fast virtual machine storage allocation with encrypted storage.

Many hypervisors handle allocating storage to virtual machines and wipe the storage prior to providing the virtual access to the storage. The wiping may involve zeroing out the content of the storage and may be a time consuming task. Wiping the storage prior to allocation may enhance security because the storage may have been used by another virtual machine and may include confidential information from the other virtual machine. Wiping the storage portion may minimize the risk that the content within the storage is "leaked" to another virtual machine. While such wiping enhances security, processing overhead associated with wiping may adversely affect performance.

Modern systems have attempted to reduce vulnerability of various attacks, unauthorized use or snooping by an unauthorized administrator or unauthorized executable code by providing memory device encryption. The encryption may be performed at the hardware level and may conceal underlying data from executable code that is tasked with managing the data. In virtualized environments, the virtual machines and the hypervisor managing the virtual machines may each have a unique encryption key to encrypt a memory page. An encryption key of a particular virtual machine may be known to the particular virtual machine. An encryption key of a particular virtual machine may be concealed from any other virtual machine, as well as the hypervisor. As such, content of a memory page encrypted using an encryption key of one virtual machine may be inaccessible by any other virtual machine or the hypervisor. In such a scenario, the content of a first virtual machine and the encryption key of the first virtual machine are both unknown to a second virtual machine. If the second virtual machine attempts to use its own encryption key to decrypt the content of the first virtual machine, the attempt may fail. However, if the content of the first machine is zeroed out prior to allocation to the second machine, then the content of the first machine may become known to the second machine (e.g., zero content). If the second virtual machine knows the content of the first virtual machine, the second virtual machine may be able to use its own encryption key on the known content to derive information regarding the encryption key of the first virtual machine. Thus, conventional solutions that involve zeroing out the content of the first virtual machine from a memory page may in fact introduce a security risk of disclosing information about the encryption key of the first virtual machine.

Aspects of the present disclosure address the above and other deficiencies by providing technology that enables a hypervisor to more efficiently detect when storage resource contents used by a virtual machine were encrypted and to more efficiently and securely reallocate the storage resources by eliminating storage wiping of the encrypted content. In one example, a hypervisor may receive an identification of a storage block (e.g., memory page) that has been released by a particular virtual machine. The hypervisor may receive a request from the particular virtual machine to free the memory page (e.g., a page free request) that was in use by the particular virtual machine. The hypervisor may determine whether the memory page is encrypted. In an example, the particular virtual machine may indicate to the hypervisor whether the memory page is encrypted or unencrypted. The hypervisor may track an encryption status corresponding to the storage block to indicate whether the storage block contains encrypted content. The encryption status may be tracked using a flag indicating the encryption status. Alternatively, a set of storage block identifiers may be used to track the encryption status, whereby a list of free storage blocks containing encrypted content is added to the set of storage block identifiers. Another list of free storage blocks containing plain text (e.g., unencrypted storage blocks) may be added to a different set of storage block identifiers.

In one example, the hypervisor may receive a request to allocate storage to a certain virtual machine. The request may be a result of a page fault received from the certain virtual machine. The hypervisor may analyze an available free storage block to determine whether the storage block contains encrypted content. The determination may be in view of the encryption status corresponding to the storage block. If the hypervisor determines that the storage block to be allocated contains encrypted content, the hypervisor may allocate the storage block to the certain virtual machine without zeroing out (e.g., clearing or wiping) the encrypted content of the storage block. If the hypervisor determines that the storage block is unencrypted, then the hypervisor may allocate the storage block to the certain virtual machine after clearing the content of the storage block.

The systems and methods described herein include technology that enhances security and memory management of virtualized computer systems. In particular, aspects of the present disclosure provide technology that enables a hypervisor to detect storage blocks (e.g., memory pages) used by a virtual machine that were encrypted. Detecting encrypted storage blocks is advantageous because it may enable the hypervisor to reduce data leaks between virtual machines without the overhead of clearing the content of every allocated storage block. Aspects of the present disclosure provide performance advantage by reducing the number of operations as well as processing time associated with clearing the content of storage blocks. Aspects of the present disclosure also enhance security for each virtual machine by eliminating leaking information regarding encryption keys of virtual machines. As described above, zeroing out the content of the storage block may present a security risk of disclosing information about the encryption key of one virtual machine to another virtual machine. By allocating the encrypted storage block without clearing the content, the risk of disclosing information regarding the encryption key of the original virtual machine is reduced. The encryption key for a particular virtual machine may be unknown even to the hypervisor. As such, if the storage block is allocated to a different virtual machine without clearing the encrypted content, the different virtual machine may not access the encrypted content. For example, the different virtual machine may attempt to decrypt the storage block using its own encryption key, however, the attempt may be unsuccessful because the encryption key does not match with the encryption key that was used to encrypt the storage block. In the case when the storage block is allocated to the same virtual machine that encrypted the storage block, the storage block may be accessible to the virtual machine, which already had access to the data on the storage block previously.

Various aspects of the above referenced methods and systems are described in details herein below by way of examples, rather than by way of limitation. The examples provided below discuss a virtualized computer system with a hypervisor without a corresponding host operating system, but other examples may include a hypervisor with an underlying host operating system.

FIG. 1 depicts an illustrative architecture of computer system 100, in accordance with an example of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include one or more virtual machines 110A-C, a hypervisor 120, hardware devices 130, and a network 140.

Virtual machines 110A-C may execute guest executable code that uses an underlying emulation of physical resources. The guest executable code may include one or more guest operating systems (not shown) that manage guest applications, guest device drivers, other executable code, or a combination thereof. Each of the virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. The guest operating systems may manage guest storage 114A-C Guest storage 114A-C may be any virtual data storage, logical data storage, physical data storage, other storage, or a combination thereof for storing, organizing, or accessing data. Guest storage 114A-C may each include a portion of physical storage devices 132 that has been designated for use by the respective virtual machine. Guest storage 114A-C may function as volatile data storage or non-volatile data storage as discussed in below in regards to physical storage devices 132. Guest storage 114A-C may store data within one or more storage blocks 116.

Storage blocks 116 may include a contiguous or non-contiguous sequence of bytes or bits and may have a size that is the same or different from a physical block size of the underlying physical storage devices 132. The size of the storage blocks 116 may be a fixed-size, such as a particular integer value (e.g., 4 KB, 2 MB) or may be a variable-size that varies within a range of integer values. Each of the storage blocks 116 may have a block size that is the same or different from the block size of an adjacent block. In one example, storage blocks 116 may be memory blocks of a volatile or non-volatile memory device and may each correspond to an individual memory page, multiple memory pages, or a portion of a memory page. A portion of the memory blocks may have a standard size (e.g., page size of 4 KB) and another portion of the memory blocks may have an enlarged size (e.g., page size of 2 MB). In another example, each of the storage blocks 116 may correspond to a portion (e.g., sector, block, partition, record, file) of a mass storage device (e.g., hard disk, solid state drive (SSD)), other data storage device, or a combination thereof.

Hypervisor 120 may also be known as a virtual machine monitor (VMM) and may provide virtual machines 110A-C with access to one or more features of hardware device. Hypervisor 120 may manage system resources, including access to hardware devices 130. In the example shown, hypervisor 120 may run directly on the hardware of computer system 100 (e.g., bare metal hypervisor). In another example, hypervisor 120 may run on or within a host operating system (not shown). Hypervisor 120 may include hypervisor storage 126, which may include multiple storage blocks that are separated into a hypervisor space 128A and a guest space 128B. Hypervisor space 128A may be allocated for use by hypervisor 120 and guest space 128B may be allocated to virtual machines 110A-C and may correspond to guest storages 114A-C. As shown in FIG. 1, hypervisor 120 may include an encryption status tracking component 122 and a storage reallocation component 124.

Encryption status tracking component 122 may process identification of storage blocks received from the virtual machines for tracking the encryption status of the storage blocks. In one implementation, the identification may be received when a virtual machine releases one or more storage blocks and transmits an indication to hypervisor 120 to indicate the one or more storage blocks were released. In an example, a released storage block 118 may be any of the storage blocks 116 that is released by the guest operating system or other portion of a virtual machine. Releasing a storage block may involve a virtual machine executing a release operation that is the same or similar to freeing, deallocating, dereferencing, deleting, removing, other operation, or a combination thereof. In one example, a release operation may be initiated by the guest operating system in response to being notified that a storage block is no longer in use. This may occur when a process managed by the guest operating system makes a system call to the guest operating system to free the storage block. In another example, a release operation may be initiated by the guest operating system in response to determining the storage is no longer in use by a process or thread managed by the guest operating system (e.g., garbage collection).

In some implementations, the identification of storage blocks may include one or more signals for indicating to hypervisor 120 that one or more storage blocks have been released. The signal may be a message, interrupt, notification, exception, trap, other signal, or a combination thereof. The signal may be transmitted from a virtual machine to the hypervisor and may occur before, during, or after a storage block is released. The signal may be a message transmitted from virtual machine 110A to hypervisor 120 that includes identification data (e.g., identifier) for a released storage block 118 or a range of released storage blocks. A signal may be one of a series of indications and each indication in the series may identify an individual storage block or an individual range of storage blocks. The signal may be transmitted in response to a particular storage block being released and may indicate to the hypervisor that the particular storage block has been released. In one example, each signal may correspond to a system call, hypercall, other function call, or a combination thereof that is initiated by the guest operating system.

In an example, the hypervisor may receive an identification of a storage block 118 that has been released by virtual machine 110A. The hypervisor 120 may receive a request (e.g., a page free request) from virtual machine 110A to free a storage block (e.g., memory page) 118 that was in use by virtual machine 110A. The hypervisor 120 may determine whether released storage block 118 is encrypted. The determination may be in view of virtual machine 110A indicating to the hypervisor 120 that the released storage block 118 is encrypted or unencrypted. In one example, a particular hardware feature (for example, physical storage device 132 of FIG. 1) of computer system 100 may have performed the encryption of storage block 118. In some implementations, a page table bit may be used to indicate whether a page is encrypted or not. For example, the hardware feature may set a page table bit associated with storage block 118 upon encrypting storage block 118. At the time storage block 118 is released, virtual machine 110A may indicate to the hypervisor 120 that the released storage block 118 is encrypted. In another example, the hypervisor may receive identification of a released storage block 119 and determine that the released storage block 119 is unencrypted.

The hypervisor 120 may track an encryption status corresponding to a storage block to indicate whether the storage block contains encrypted content. The encryption status may be tracked using a flag (e.g., a page flag) indicating the encryption status. For example, hypervisor 120 may set a flag associated with storage block 118 to indicate that the storage block 118 is encrypted based on the indication received from virtual machine 110A that the storage block 118 is encrypted. In an example, the flag may be part of the storage block 118, such as a page flag. In another example, a flag associated with storage block 119 may indicate that the storage block 119 is unencrypted.

Alternatively, a set of storage block identifiers may be used to track storage block encryption status corresponding to a particular type of encryption status. In an example, hypervisor 120 may create and maintain a set of storage block identifiers for encrypted storage blocks. Upon receiving identification of released storage block 118, Hypervisor 120 may add the storage block identifier for storage block 118 to the set of storage block identifiers. Hypervisor 120 may add the storage block identifier to the set based on the indication received from virtual machine 110A that the storage block 118 is encrypted. In an example, an encrypted free page list is used to set and track the encryption status of a first plurality of released storage blocks, including the released storage block 118, when each of the first plurality of released storage blocks is determined to be encrypted based on indication received from corresponding virtual machines. Another set of storage block identifiers, such as, a plain free list, may be used to track the encryption status of released storage blocks containing unencrypted content. An identifier of storage block 119 may be added to the plain free list when the storage block 119 is determined to be unencrypted based on indication received from virtual machine 110A that the storage block 119 is unencrypted. The plain free list may be used to track a second plurality of storage blocks, where each of the second plurality of storage blocks is determined to be unencrypted based on indication received from corresponding virtual machines indicating the encryption status of each of the second plurality of storage blocks.

In some implementations, the identification of storage blocks may include one or more signals for indicating to hypervisor 120 that a page fault notification associated with the storage block has been received. The hypervisor 120 may receive a page fault notification from virtual machine 110B. Virtual machine 110B may include guest storage 114B comprising encrypted storage blocks 115 and/or unencrypted storage blocks 117. The page fault notification may be associated with a storage block of virtual machine 110B, such as storage block 115 or storage block 117. The hypervisor 120 may determine whether the page fault notification is received for an encrypted or unencrypted storage block. In one example, the hypervisor may determine that the page fault notification is received for an encrypted storage block 115. In another example, the hypervisor may determine that the page fault notification is received for an unencrypted storage block 117. The hypervisor may track the encryption status corresponding to the storage block for which the fault notification was received. As discussed above, the encryption status may be tracked by the hypervisor 120 setting a flag (e.g., a page flag) indicating the encryption status, and/or adding a storage block identifier to a set of storage block identifiers for a particular encryption status based on the determination by hypervisor 120 whether the page fault notification is received for an encrypted or unencrypted storage block.

Storage reallocation component 124 may interact with encryption status tracking component 122 to determine which storage blocks may be used to fulfill requests for storage block allocation, and reallocate the determined storage block to fulfill a reallocation request. Storage reallocation component 124 may analyze data of encryption status tracking component 122 to distinguish between storage block 129A that is an encrypted storage block from storage block 129B that is an unencrypted storage block. In one example, the hypervisor may reallocate the encrypted storage block because advantageously such a storage block may be reallocated without clearing the content.

For example, the hypervisor 120 may receive a request to allocate storage to one of the virtual machines 110A-C. The request may be a result of a page fault received from one of the virtual machines 110A-C, such as, virtual machine 110C. Storage reallocation component 124 may analyze a storage block identified by encryption status tracking component 122 to determine whether the storage block contains encrypted content. In one example, storage reallocation component 124 may analyze storage block 118. Storage reallocation component 124 may determine that the storage block 118 contains encrypted content based on the encryption status corresponding to the storage block 118. Storage reallocation component 124 may allocate the storage block 118 to virtual machine 110C without zeroing out (e.g., clearing or wiping) the encrypted content of storage block 118. In another example, storage reallocation component 124 may analyze storage block 117. Storage reallocation component 124 may determine that the storage block 117 does not contain encrypted data (e.g., storage block is unencrypted). Storage reallocation component 124 may allocate storage block 117 to virtual machine 110C after clearing the content of storage block 117.

Hardware devices 130 may provide hardware functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks discussed above in regards to components 122 and 124. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). Physical processing device 134 may also be referred to as a central processing unit (CPU).

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
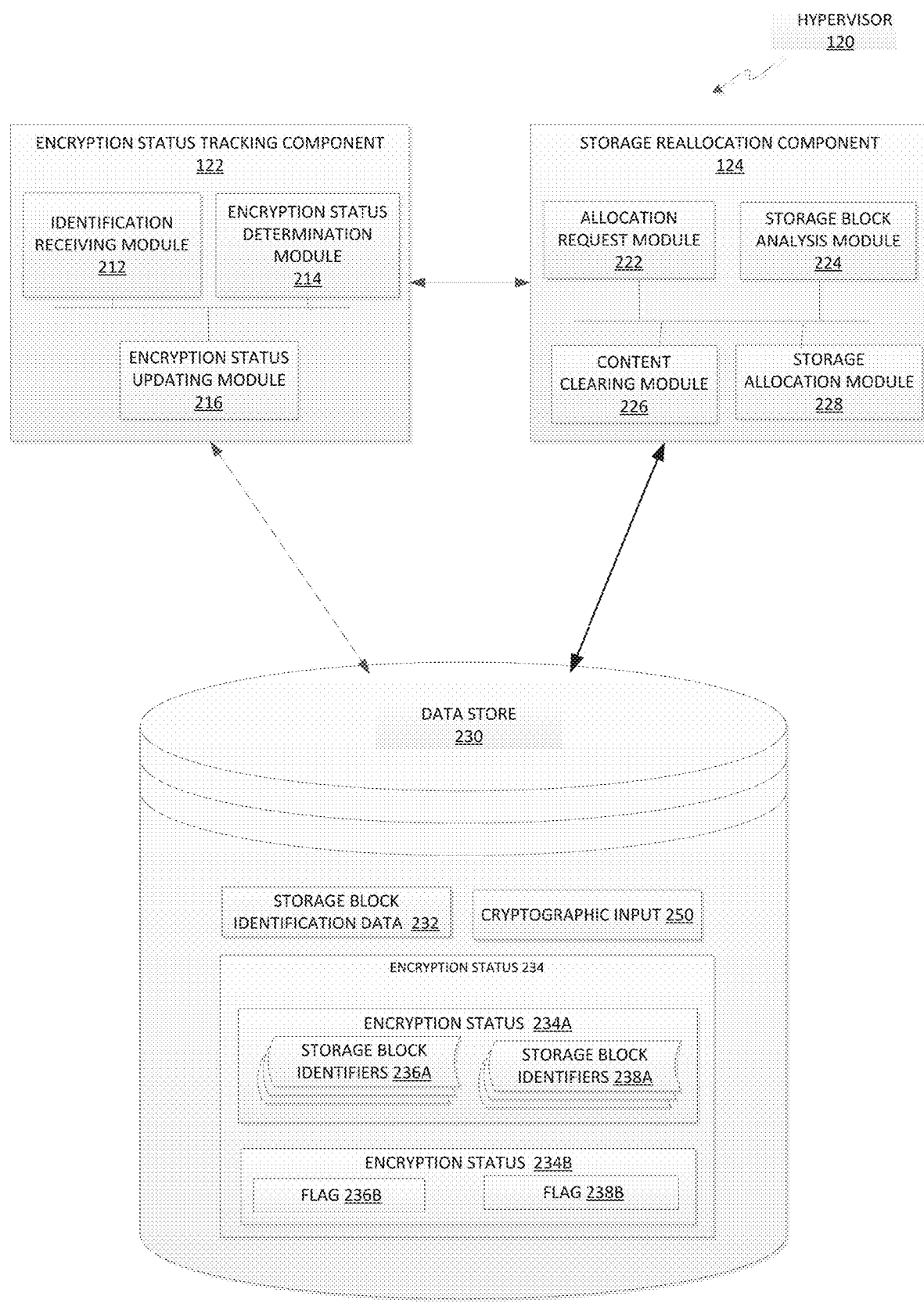
FIG. 2 schematically illustrates an example apparatus in which implementations of the disclosure may operate.

FIG. 2 is a block diagram illustrating example components and modules of hypervisor 120, in accordance with one or more aspects of the present disclosure. Hypervisor 120 may be the same or similar to the hypervisor 120 of FIG. 1 and may include an encryption status tracking component 122 and a storage reallocation component 124. More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

Encryption status tracking component 122 and storage reallocation component 124 may use data from or store data and/or instructions to data store 230. Data store 230 may include any non-persistent data storage (e.g., memory), persistent data storage (e.g., flash storage, hard drive, tape), other medium, or combination thereof that is capable of storing instructions for carrying out the operations of the components and modules discussed herein. Data store 230 may store storage block identification data 232, cryptographic input 250, encryption status 234, encryption status 234A, encryption status 234B, storage block identifiers 236A and 238A, flag 236B and 238B, etc.

Encryption status tracking component 122 may process identification of storage blocks received from the virtual machines for tracking the encryption status of the storage blocks. Encryption status tracking component 122 may track a storage block to indicate whether the storage block contains encrypted content. Encryption status tracking component 122 may include an identification receiving module 212, encryption status determination module 214, and an encryption status updating module 216.

Identification receiving module 212 may be a portion of hypervisor that receives identification signals from the virtual machine. The identification signals may include storage block identification data 232 for identifying one or more storage blocks or ranges of storage blocks. Storage block identification data 232 may include an offset value (numeric or non-numeric value), an address (virtual, logical, or physical address), a pointer, a link, other data, or a combination thereof.

In one implementation, the identification data 232 may be a storage block identifier that uniquely identifies a released storage block or may be data (e.g., offset value) that may be used by hypervisor 120 to determine the storage block identifier of a released storage block. In one example, the identification data 232 may be received by the hypervisor 120 from a virtual machine, such as, virtual machine 110A. In an example, the hypervisor may receive identification data 232 for a storage block 118 that has been released by virtual machine 110A (referring to FIG. 1). The hypervisor may receive a request (e.g., a page free request) from virtual machine 110A to free a storage block (e.g., memory page) 118 that was in use by virtual machine 110A.

In another implementation, the identification data 232 may be received when the hypervisor 120 receives a page fault notification. The hypervisor 120 may receive a page fault notification from virtual machine 110B. In an example, the hypervisor may receive identification data 232 for a storage block 115 for which the hypervisor 120 received a page fault notification (referring to FIG. 1). In another example, the hypervisor may receive identification data 232 for a storage block 117 for which the hypervisor 120 received a page fault notification (referring to FIG. 1).

Encryption status determination module 214 may analyze the identified storage blocks for which the identification receiving module 212 received storage block identifiers. Encryption status determination module 214 may determine whether an identified storage block contains encrypted content. The identified storage blocks may include, for example, storage blocks 115, 117, 118, and 119, as referred to in FIG. 1. In one example, a particular hardware feature (for example, physical storage device 132 of FIG. 1) of computer system 100 may have performed an encryption of the identified storage block. The encryption may be performed using a cryptographic input associated with the particular hardware feature. In an example, the particular hardware feature may perform the encryption at a storage block level granularity. In some implementations, a page table bit is used to indicate whether a page is encrypted or not. For example, the hardware feature can set a page table bit associated with a respective page upon encrypting the respective page.

In one example, encryption status determination module 214 may determine whether an identified storage block contains encrypted content based on the page table bit indicated by the hardware feature. Encryption status determination module 214 may determine an identified storage block is encrypted when it is determined that the storage block contains encrypted content. In another example, encryption status determination module 214 may determine an identified storage block is unencrypted when it is determined that the storage block does not contain encrypted content.

Encryption status updating module 216 may track an encryption status by updating an encryption status corresponding to an identified storage block based on data of identification receiving module 212 and encryption status determination module 214. The encryption status may indicate whether an identified storage block is encrypted or unencrypted. For example, the hypervisor 120 may use encryption status 234 corresponding to one of the storage blocks 115, 117, 118, or 119 (referring to FIG. 1) to track and indicate whether the storage block contains encrypted content. The indication may be based on the determination made by encryption status determination module 214. In some implementations, encryption status may be represented by an encryption status 234A and/or 234B. Although status 234A and 234B both include encryption status of a storage block, they may store and represent the data differently.

In one implementation, hypervisor 120 may track encryption status using a set of storage block identifiers associated with storage blocks corresponding to a particular type of encryption status. The hypervisor may create and maintain the set of storage block identifiers in the hypervisor space 128A of hypervisor storage 126, as shown in FIG. 1. Hypervisor 120 may add a storage block identifier to the set of storage block identifiers based on the encryption status determination module 214 determining whether a storage block is encrypted or unencrypted. In one example, hypervisor 120 may track encryption status 234A using a set of storage block identifiers 236A associated with storage blocks that have a status type of "encrypted" (e.g., indicating that the storage blocks are encrypted). For example, the storage block identifiers 236A may include an identifier for storage block 118, and/or storage block 115. For example, the storage block identifiers 236A may be an encrypted free page list. In another example, hypervisor 120 may track encryption status 234A using a set of storage block identifiers 238A associated with storage blocks that have a status type of "unencrypted" (e.g., indicating that the storage blocks are unencrypted). For example, the storage block identifiers 238A may include an identifier for storage block 119, and/or storage block 117. For example, the storage block identifiers 238A may be a plain free page list. In such implementations, updating the encryption status may involve adding an identified storage block identifier to the set of storage block identifier 236A to indicate that the storage block is encrypted, removing an identified storage block identifier from the set of storage block identifier 236A, or adding the identified storage block identifier to the set of storage block identifier 238A to indicate the storage block is not encrypted, etc.

Each of the storage block identifiers 236A (or 238A) may include an offset value (numeric or non-numeric value), an address (virtual, logical, or physical address), a pointer, a link, other data, or a combination thereof. The storage block identifiers 236A or 238A may be a data structure, such as, may be an array (e.g., bitmap), a linked list, other data structure, or a combination thereof. Storage block identifier 236A (or 238A) may include a storage block that is received from a page free request or in view of a page fault associated with the storage block, or a combination thereof.

In an implementation, hypervisor 120 may track encryption status using a flag associated with a storage block identifier. For example, a flag 236B associated with storage block 118 may indicate that the storage block 118 is encrypted. In an example, flag 236B may be a page flag that is part of a memory page (e.g., storage block 118). Hypervisor 120 may set the flag to the storage block based on indication received from the virtual machine that released the storage block that the storage block is encrypted. In another example, a flag 238B associated with storage block 119 may indicate that the storage block 119 is unencrypted. A flag may be a binary bit that indicates whether the corresponding storage block is encrypted or not. Encryption status updating module 216 may clear a flag (e.g., switch off the binary bit) when the corresponding storage block is determined to be unencrypted based on the indication received from the virtual machine that released the storage block. In such implementations, updating the encryption status may involve setting the encryption status (e.g., flag) to indicate that the storage block is encrypted, or clearing the encryption status to indicate the storage block is not encrypted, etc.

Storage reallocation component 124 may interact with encryption status tracking component 122 to determine which storage blocks may be used to fulfill requests for storage block allocation. Traditionally, reallocating a storage block may involve wiping or clearing the existing content of the storage block prior to reallocating the storage block for security purposes. The technology described herein may enable hypervisor 120 to reallocate storage blocks in a more efficient and secure manner because storage reallocation component 124 may be able to distinguish between an encrypted storage block from an unencrypted storage block. As a result, storage reallocation component 124 may reallocate the storage block without clearing the content. In the example shown in FIG. 2, storage reallocation component 124 may include an allocation request module 222, a storage block analysis module 224, a content clearing module 228, and a storage allocation module 228.

Allocation request module 222 may receive or access a request from a virtual machine to allocate storage to the virtual machine. The virtual machine may initiate the request using a variety of different mechanism. A first mechanism may involve a failed attempt to access a storage block that no longer resides at the designated location in the physical storage device. This may occur when the storage block is a memory page and the memory page has been evicted. The attempt to access the memory page may generate a page fault, which may be addressed by an underlying memory management module. The page fault may function as the request to allocate storage. In an example, allocation request module 222 may receive a request to allocate storage to one of the virtual machines 110A-C, such as virtual machine 110C as a result of a page fault received by the hypervisor 120.

A second mechanism may involve a virtual machine initiating the request using a hypercall. The virtual machine may be executing in a para-virtualized environment and be aware of and able to communicate with the hypervisor using hypercalls. A hypercall may be similar to a system call but may enable a thread executed by the virtual machine to communicate with the hypervisor as opposed to the guest operating system. In one example, the hypercall may be used to implement storage ballooning.

Storage block analysis module 224 may enable hypervisor 120 to analyze a storage block identified by storage block identification data 232 to determine whether the storage block contains encrypted content. The determination may be in view of the encryption status 234 corresponding to the identified storage block. In one implementation, storage block analysis module 224 may optionally gather data about multiple different aspects of each storage block identified by storage block identification data 232, such as, the source of the storage block (e.g., associated virtual machine, original owner), the size of the storage block (e.g., standard page or huge page), the location of the storage block (e.g., proximity to other released storage blocks), other information, or a combination thereof. Based on the gathered data, storage block analysis module 224 may select a storage block that fulfills the allocation request received by allocation request module 222. Storage block analysis module 224 may analyze the selected storage block to determine the encryption status corresponding to the selected storage block.

In one example, storage block analysis module 224 may select storage block 118 to analyze. Storage block analysis module 224 may determine that the storage block 118 contains encrypted content based on the encryption status corresponding to the storage block 118. The encryption status corresponding storage block 118 may be obtained from storage block identifiers 236A (e.g, an encrypted free list), or from flag 236A. In some implementations, storage block analysis module 224 may attempt to select a storage block identified in the storage block identifiers 236A comprising storage block identifiers with encrypted content in order to avoid clearing the content of the storage block prior to reallocation.

In another example, storage block analysis module 224 may select storage block 117 to analyze. Storage block analysis module 224 may determine that the storage block 117 does not contain encrypted content based on the encryption status corresponding to the storage block 117. The encryption status corresponding storage block 117 may be obtained from storage block identifiers 238A (e.g, a plain free list), or from flag 238A.

Content clearing module 226 may access a storage block and clear the selected block. Clearing the content may involve overwriting, replacing, resetting, wiping, or zeroing out the data within the storage block. The clearing may occur before, during, or after the storage block is allocated to the requesting virtual machine but before the virtual machine can access the content of the storage block. If it is determined that the selected storage block is encrypted (e.g., contains encrypted content), content clearing module 226 may not be executed to avoid clearing the selected storage block prior to reallocating the selected storage block to virtual machine 110C. If it is determined that the selected storage block is unencrypted (e.g., does not contain encrypted content), content clearing module 226 may be executed to clear the content of the storage block prior to reallocating the selected storage block to virtual machine 110C.

Storage allocation module 228 may allocate the selected storage block to the virtual machine requesting storage allocation. Allocating the storage block to the virtual machine that requested it may involve updating one or more storage data structures that manage the storage to indicate that the storage block has been allocated to the virtual machine. In some implementations, in response to the allocation, storage block identifiers 236A and 238A may be updated to remove the storage block that was just allocated, if the storage block was included in either of the storage block identifiers. In one example, storage allocation module 228 may allocate storage block 117 to virtual machine 110C. As it was determined that the storage block 118C is unencrypted, storage allocation module 228 may allocate storage block 117 to virtual machine 110C after clearing the content of storage block 117.

In another example, storage allocation module 228 may allocate selected storage block 118 to virtual machine 110C. As it was determined that the storage block 118C is encrypted, storage allocation module 228 may allocate the storage block 118 to virtual machine 110C without zeroing out (e.g., clearing or wiping) the encrypted content of storage block 118. Even though storage block 118 was released by virtual machine 110A, and is being allocated to a different virtual machine 110C, hypervisor 120 may not clear out the content of the storage block 118 because virtual machine 110C may not access the content of storage block 118 as the content is encrypted.

Content encrypted by one virtual machine may not be accessible by another virtual machine. In some implementations, a virtual machine may encrypt a storage block using a cryptographic input (e.g., encryption key). A cryptographic input may include any data that is used to generate a cryptographic key or is used by a cryptographic function to encrypt or decrypt content data. Cryptographic input 250 shown in FIG. 2 may be any cryptographic bit sequence including encryption keys, decryption keys, public keys, private keys, symmetric keys, asymmetric keys, other cryptographic data, or a combination thereof. Cryptographic input 250 may include or be generated or derived from one or more initialization vectors, starting variables, other data, or a combination thereof. Cryptographic input 250 may include or be based on the spatial data, temporal data, or contextual data discussed above. In some virtualized environments involving memory device encryption, each of the virtual machine and the hypervisor may be provided with unique cryptographic inputs. In some examples, an underlying hardware may execute a cryptographic function to generate the cryptographic input and/or to encrypt a storage block using a hardware feature (e.g., a hardware feature of a memory device) and/or lower-level executable codes.

In an example, prior to virtual machine 110A releasing the storage block 118, content of storage block 118 may be encrypted using a first cryptographic input 150A (referring to FIG. 1), which is comparable to cryptographic input 250. Only virtual machine 110A may have access to cryptographic input 150A. Cryptographic input 150A may be concealed from hypervisor 120. Cryptographic input 150A may be concealed from any virtual machine other than virtual machine 110A (e.g., virtual machines 110B and 110C). Virtual machines 110C may have access to a different cryptographic input 150C. Cryptographic input 150C may be comparable to cryptographic input 250 and 150A. However, the value of cryptographic input 150C may be different from the value of cryptographic input 150A.

When storage block 118 encrypted using the cryptographic input 150A is released and later allocated to a different virtual machine 110C, encrypted content of storage block 118 may be inaccessible by virtual machine 110C. For example, virtual machine 110C may attempt to decrypt the encrypted content of storage block 118 using cryptographic input 150C. However, the attempt may be unsuccessful because the storage block 118 may not be decrypted with a cryptographic input 150C that is different from the cryptographic input 150A using which the encrypted content of the storage block 118 was encrypted. The attempt to decrypt with cryptographic input 150C may result in mangled, garbled, or meaningless values. In the current example, the encrypted content of the storage block 118 may not be accessible by a virtual machine 110C, which is not the virtual machine that released the storage block 118 prior to the storage block 118 being allocated to virtual machine 110C, nor is virtual machine 110C the virtual machine that encrypted the content of storage block 118. Therefore, when the storage block is encrypted, the storage block may be reallocated without clearing the content of the storage block, enabling fast virtual machine storage block (e.g., guest page) allocation using encrypted memory.

In an example, when the storage block 118 is reallocated to the original virtual machine that released it prior to being reallocated, or a virtual machine that encrypted the content prior to reallocation, the storage block may be accessible by the original virtual machine. For example, if the storage reallocation request was received from virtual machine 110A, and the storage block 118 released by virtual machine 110A was reallocated to virtual machine 110A, the content of storage block 118 may be accessible to virtual machine 110A using the cryptographic input 150A. Since virtual machine 110A already had access to the content on storage block 118, the storage block may be reallocated without clearing the content of the storage block, enabling fast virtual machine storage block (e.g., guest page) allocation using encrypted memory.

Figure 3:
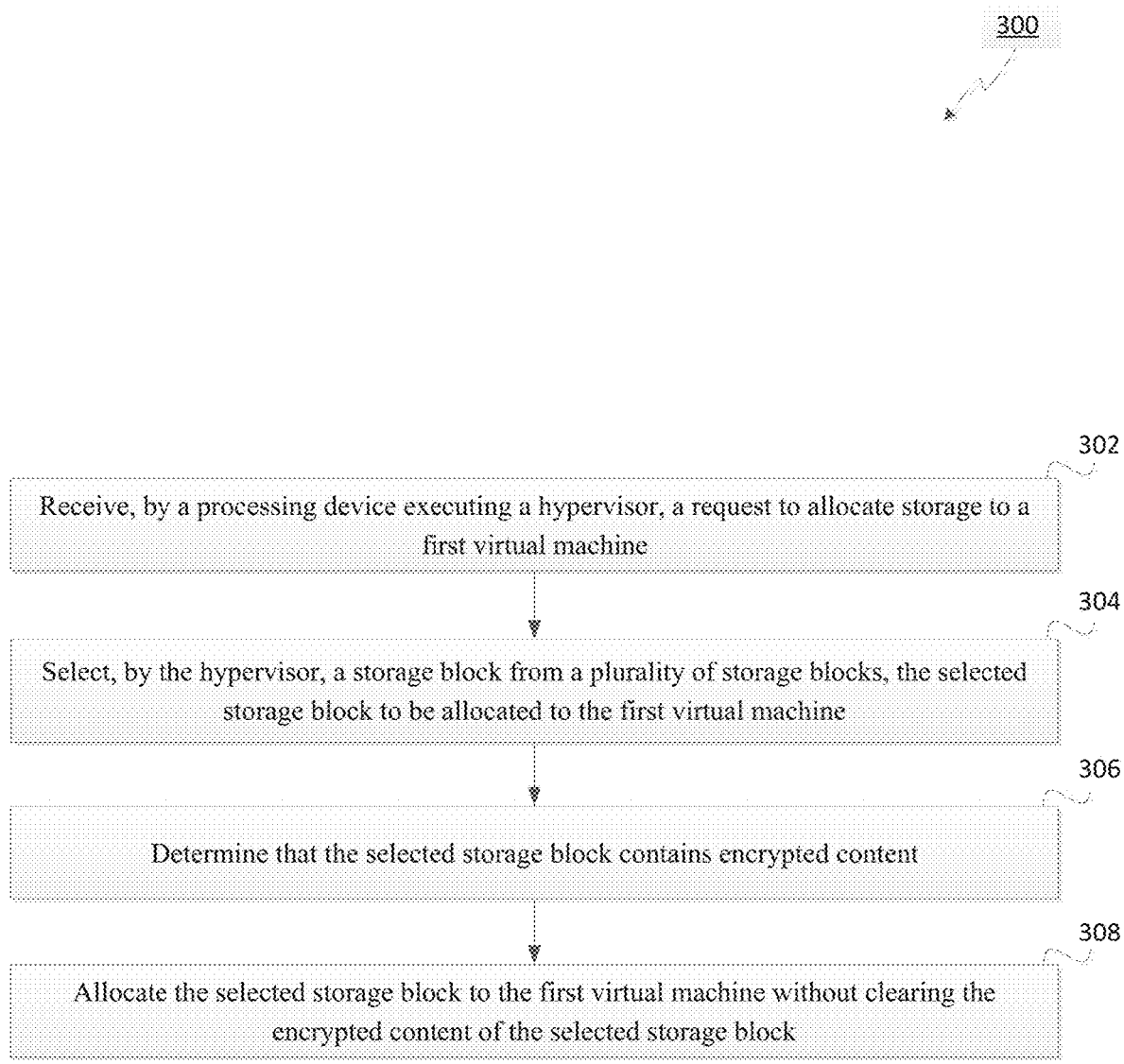
FIG. 3 depicts a flow diagram of a method for a hypervisor to implement fast virtual machine storage allocation with encrypted storage, in accordance with one or more aspects of the disclosure.
Figure 4:
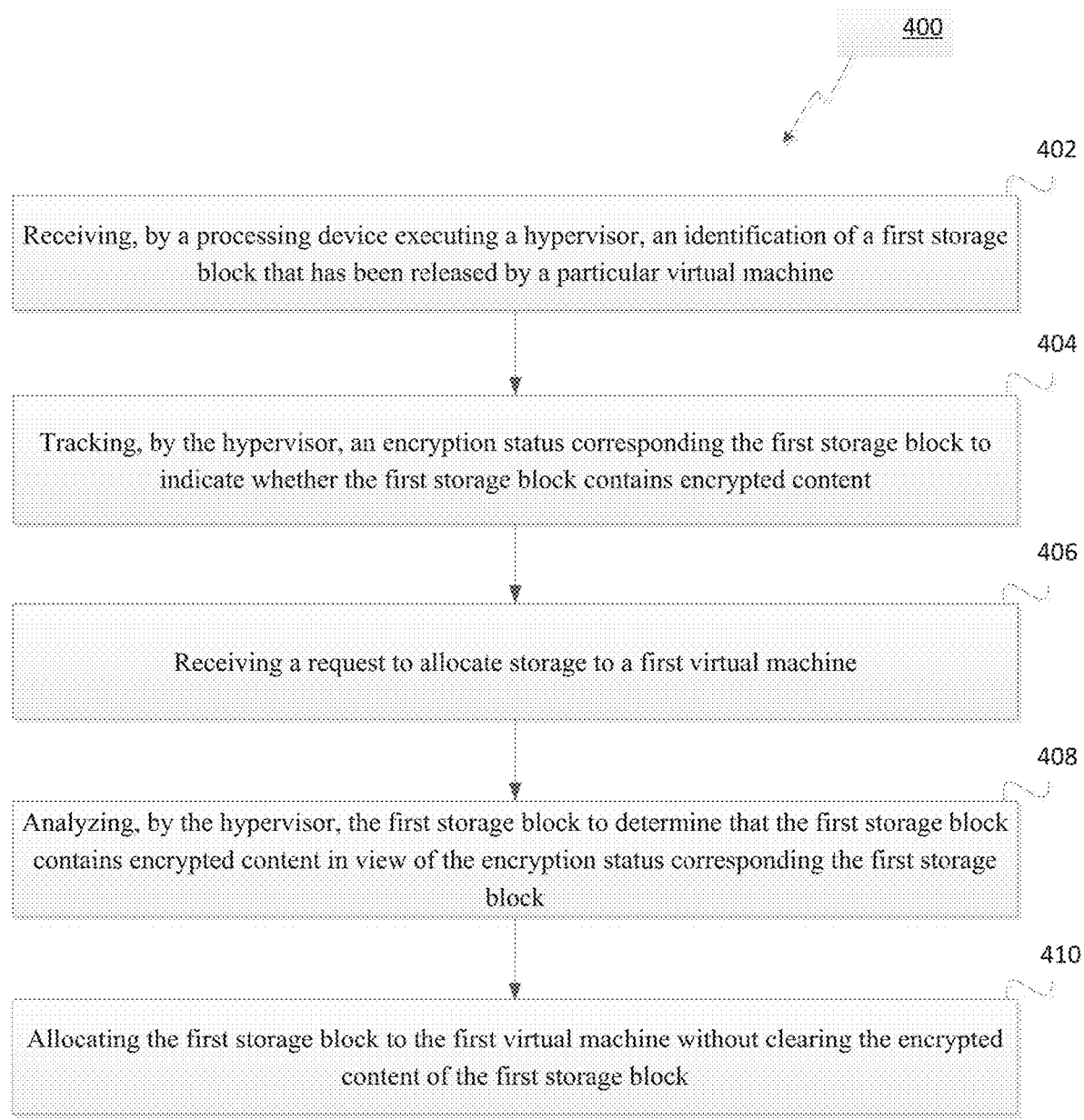
FIG. 4 depicts a flow diagram of a method for encryption status tracking and fast allocation of virtual machine storage with encrypted storage, in accordance with one or more aspects of the disclosure.

FIGS. 3 and 4 depict flow diagrams for illustrative examples of methods 300 and 400 for fast storage allocation with encrypted storage. Method 300 includes a method for a hypervisor to implement fast virtual machine storage allocation with encrypted storage. Method 400 includes a method for encryption status tracking and fast allocation of virtual machine storage with encrypted storage. Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computer system 100 as shown in FIG. 1.

Referring to FIG. 3, method 300 may be performed by one or more processing devices of the computer system. At block 302, a processing device executing a hypervisor may receive a request to allocate storage to a first virtual machine. The first virtual machine may initiate the request using a variety of different mechanism. A first mechanism may involve a page fault in response to attempting to access a storage block that no longer resides at the designated location in the physical storage device. This may occur when the storage block is a memory page and the memory page has been evicted. The page fault may be addressed by an underlying memory management module and may function as the request to allocate storage for the virtual machine. A second mechanism may involve the first virtual machine initiating the request using a hypercall. In one example, the hypercall may originate from a balloon driver installed on the guest operating system.

At block 304, the hypervisor may select a storage block from a plurality of storage blocks, where the selected storage block is to be allocated to the first virtual machine. In one example, the identification of the storage block of the plurality of storage blocks may be received by the processing device where the plurality of storage blocks have been released by one or more virtual machines prior to selecting the storage block from the plurality of storage blocks. In another example, the identification of the storage block of the plurality of storage blocks may be received by the processing device in view of receiving a page fault notification associated with the storage block, wherein the page fault notification is received from a particular virtual machine prior to selecting the storage block from the plurality of storage blocks. In addition, after receiving the identification, the processing device may set an encryption status corresponding to the storage block to indicate whether the storage block contains encrypted content.

At block 306, it may be determined that the selected storage block contains encrypted content. The determination may be in view of the encryption status corresponding to the selected storage block. In some implementation, the encryption status may be obtained from a flag (e.g., a binary bit) associated with the selected storage block. In other implementations, the encryption status may be obtained from a set of storage block identifiers associated with a plurality of storage blocks corresponding to a particular type of encryption status. The types of encryption status may include "encrypted," "unencrypted," "plain," etc.

At block 308, the selected storage block containing the encrypted content may be allocated to the first virtual machine without clearing the encrypted content of the selected storage block. Allocating the storage block to the virtual machine that requested it may involve updating one or more storage data structures that manage the storage to indicate that the storage block has been allocated to the virtual machine. The encrypted content of the selected storage block may not be accessible by a virtual machine that is not the virtual machine that released the selected storage block prior to the storage block being allocated to the first virtual machine, or a virtual machine that is not the virtual machine that encrypted the content of selected storage block. Therefore, when the storage block is encrypted, the storage block may be reallocated without clearing the content of the storage block, enabling fast virtual machine storage block (e.g., guest page) allocation using encrypted storage.

Referring to FIG. 4, method 400 may be performed by one or more processing devices of the computer system. Method 400 may begin at block 402, a processing device executing a hypervisor may receive an identification of a first storage block that has been released by a first virtual machine.

At block 404, the hypervisor may track an encryption status corresponding to the first storage block to indicate whether the first storage block contains encrypted content. In one implementation, the encryption status corresponding to the first storage block may be tracked using a flag associated the first storage block. In another implementation, the encryption status corresponding the first storage block may be tracked using a set of storage block identifiers associated with a plurality of storage blocks corresponding to a particular type of encryption status. The types of encryption status may include "encrypted," "unencrypted," "plain," etc. In one example, upon receiving identification of the first storage block, the hypervisor may determine that the first storage block contains encrypted content and update the encryption status corresponding to the first storage block to indicate that the first storage block contains encrypted content. In another example, the hypervisor may receive identification of a second storage block that has been released by a third virtual machine. The hypervisor may determine that the second storage block does not contain encrypted content (e.g., second storage block is unencrypted), and track the encryption status corresponding to the second storage block to indicate that the second storage block does not contain encrypted content (e.g., that the second storage block is unencrypted).

At block 406, a request may be received to allocate storage to a second virtual machine. The second virtual machine may initiate the request using a variety of different mechanism. A first mechanism may involve a page fault in response to attempting to access a storage block that no longer resides at the designated location in the physical storage device. This may occur when the storage block is a memory page and the memory page has been evicted. The page fault may be addressed by an underlying memory management module and may function as the request to allocate storage for the virtual machine. A second mechanism may involve the second virtual machine initiating the request using a hypercall. In one example, the hypercall may originate from a balloon driver installed on the guest operating system. In another example, a request may be received to allocate storage to a fourth virtual machine using the above described mechanisms.

At block 408, the hypervisor may analyze the first storage block to determine that the first storage block contains encrypted content in view of the encryption status corresponding the first storage block. In another example, when the hypervisor receives identification of a second storage block, the hypervisor may analyze the second storage block to determine that the second storage block does not contain encrypted content in view of the encryption status corresponding to the second storage block.

At block 410, the first storage block containing the encrypted content may be allocated to the second virtual machine without clearing the encrypted content of the first storage block. In an example, the encrypted content of the first storage block may be encrypted using a first cryptographic input. Additionally, the first cryptographic input may be concealed from the hypervisor. Furthermore, the first cryptographic input may be concealed from the second virtual machine. In one example, the encrypted content of the first storage block may be encrypted using a first cryptographic input in view of a hardware feature of a memory device. Because the first cryptographic input may be concealed from the hypervisor and other virtual machines, the first storage block may be reallocated without clearing the content of the first storage block, enabling fast virtual machine storage block allocation using encrypted memory.

In an implementation, the encrypted content of the first storage block may be inaccessible by the second virtual machine. In one example, the encrypted content of the first storage block may be inaccessible by the second virtual machine where the second virtual machine may be different from the first virtual machine that released the first storage block prior to the analyzing of the first storage block to determine that the first storage block contains encrypted content. In another example, the encrypted content of the first storage block may be inaccessible by the first virtual machine where the second virtual machine may not be a virtual machine that encrypted the encrypted content. Alternatively, the encrypted content of the first storage block may be inaccessible by the second virtual machine when the second virtual machine may be associated with a second cryptographic input, the second cryptographic input being different from a first cryptographic input using which the encrypted content of the first storage block was encrypted. Additionally, the encrypted content of the first storage block may be inaccessible using the second cryptographic input associated with the second virtual machine. Because the encrypted content of the first storage block may be inaccessible by the second virtual machine, the first storage block may be reallocated without clearing the content of the first storage block, enabling fast virtual machine storage block allocation using encrypted memory. In the alternative example, the second storage block may be allocated to the fourth virtual machine after clearing content of the second storage block.

Figure 5:
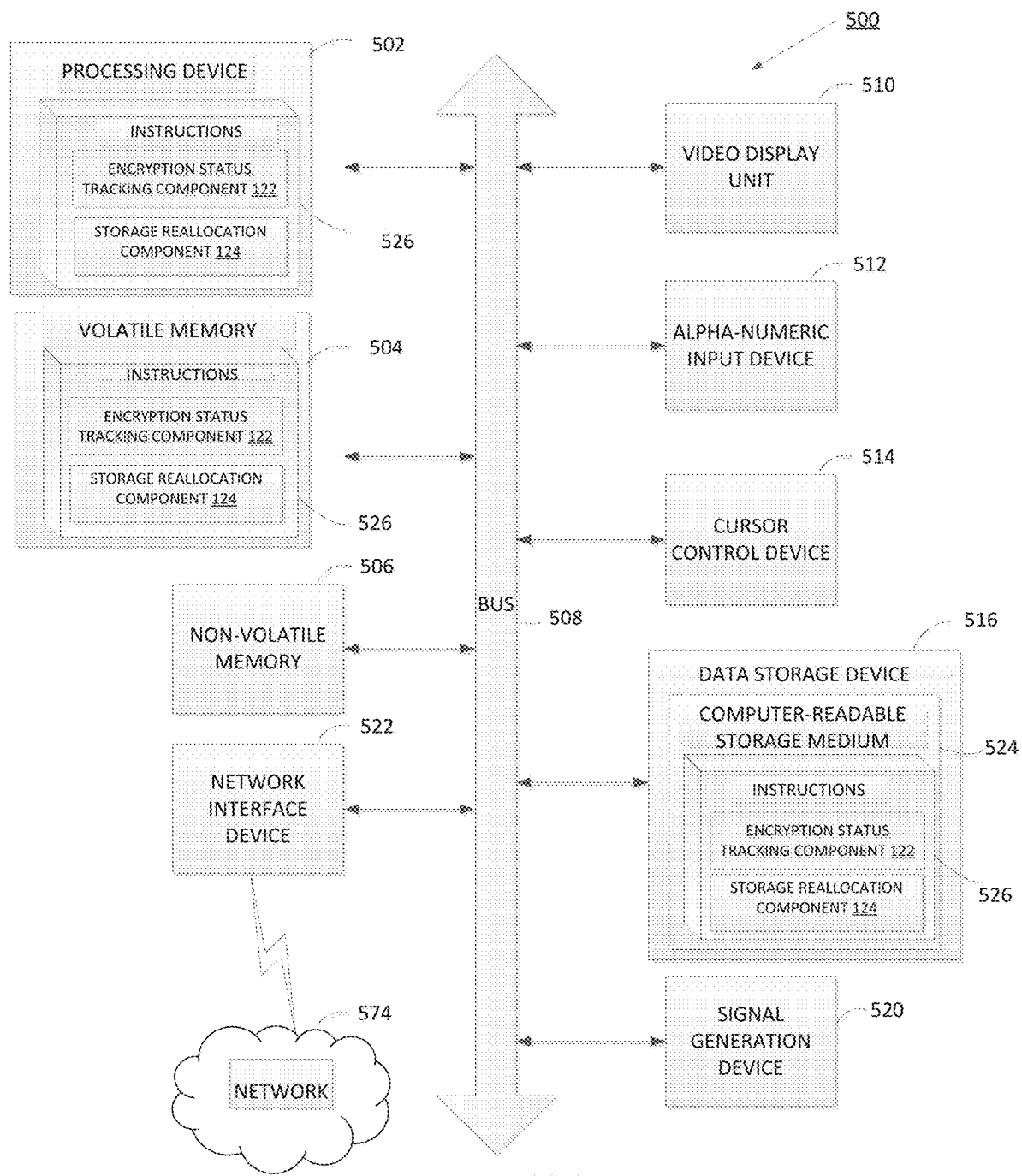
FIG. 5 depicts a block diagram of an illustrative computing device operating in accordance with the examples of the disclosure.

FIG. 5 depicts a block diagram of a computer system operating in accordance with one or more aspects of the present disclosure. In various illustrative examples, computer system 500 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 400 and for an encryption status tracking component 122, a storage reallocation component 124, and modules illustrated in FIGS. 1 and 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 400, and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, by a processing device executing an operating system (OS), an identification of a first storage block that has been released by a first virtual machine;
    tracking, by the OS, an encryption status corresponding to the first storage block to indicate whether the first storage block contains encrypted content;
    receiving a request to allocate storage to a second virtual machine;
    analyzing, by the OS, the first storage block to determine that the first storage block contains encrypted content in view of the encryption status corresponding the first storage block; and
    allocating the first storage block containing the encrypted content to the second virtual machine.

2. The method of claim 1, wherein the encryption status corresponding to the first storage block is tracked using a flag associated the first storage block.

3. The method of claim 1, wherein the encryption status corresponding the first storage block is tracked using a set of storage block identifiers associated with a plurality of storage blocks corresponding to a particular type of encryption status.

4. The method of claim 1, further comprising:
    upon receiving identification of the first storage block, determining that the first storage block contains encrypted content; and
    updating the encryption status corresponding to the first storage block to indicate that the first storage block contains encrypted content.

5. The method of claim 1, further comprising:
    receiving identification of a second storage block that has been released by a third virtual machine;
    determining that the second storage block does not contain encrypted content; and
    tracking the encryption status corresponding to the second storage block to indicate that the second storage block does not contain encrypted content.

6. The method of claim 5, further comprising:
    receiving a request to allocate storage to a fourth virtual machine;
    analyzing, by the OS, the second storage block to determine that the second storage block does not contain encrypted content in view of the encryption status corresponding to the second storage block; and
    allocating the second storage block to the fourth virtual machine after clearing content of the second storage block.

7. The method of claim 1, wherein the encrypted content of the first storage block is encrypted using a first cryptographic input.

8. The method of claim 7, wherein the first cryptographic input is concealed from the OS.

9. The method of claim 7, wherein the first cryptographic input is concealed from the second virtual machine.

10. The method of claim 1, wherein the encrypted content of the first storage block is encrypted using a first cryptographic input in view of a hardware feature of a memory device.

11. The method of claim 1, wherein the encrypted content of the first storage block is inaccessible by the second virtual machine.

12. The method of claim 11, wherein the second virtual machine is different from the first virtual machine that released the first storage block prior to the analyzing of the first storage block to determine that the first storage block contains encrypted content.

13. The method of claim 11, wherein the second virtual machine is not a virtual machine that encrypted the encrypted content.

14. The method of claim 11, wherein the second virtual machine is associated with a second cryptographic input, the second cryptographic input being different from a first cryptographic input using which the encrypted content of the first storage block was encrypted.

15. The method of claim 11, wherein the encrypted content of the first storage block is inaccessible using the second cryptographic input associated with the second virtual machine.

16. A system comprising:
    a memory device;
    a processing device, coupled to the memory, wherein the processing device is to:
        receive, by a processing device executing an operating system (OS), a request to allocate storage to a first virtual machine;
        select, by the OS, a storage block from a plurality of storage blocks, the selected storage block to be allocated to the first virtual machine;
        determine that the selected storage block contains encrypted content; and
        allocate the selected storage block containing the encrypted content to the first virtual machine.

17. The system of claim 16, wherein to determine that the selected storage block contains encrypted content, the processing device is to:
    receive an identification of the storage block of the plurality of storage blocks that have been released by one or more virtual machines prior to selecting the storage block from the plurality of storage blocks;
    set an encryption status corresponding to the storage block to indicate whether the storage block contains encrypted content; and determine that the selected storage block contains encrypted content in view of the encryption status corresponding to the selected storage block.

18. The system of claim 16, wherein to determine that the selected storage block contains encrypted content, the processing device is to:
- prior to selecting the storage block, receive an identification of the storage block of the plurality of storage blocks in view of receiving a page fault notification associated with the storage block, wherein the page fault notification is received from a particular virtual machine;
- set an encryption status corresponding to the storage block to indicate whether the storage block contains encrypted content; and
- determine that the selected storage block contains encrypted content in view of the encryption status corresponding to the selected storage block.

19. A non-transitory device-readable medium storing instructions that, when executed by a processing device, cause the processing device to perform operations comprising:

- receiving, by a processing device executing an operating system (OS), an indication that a storage block contains encrypted content, the storage block being released by a first virtual machine;
- adding, by the OS, an identifier of the storage block to a set of storage block identifiers, wherein each storage block identifier in the set is associated with a storage block containing encrypted content;
- receiving a request to allocate storage to a second virtual machine;
- selecting, by the OS, a storage block identifier from the set of storage block identifiers to identify a particular storage block to allocate to the second virtual machine; and
- allocating the particular storage block containing the encrypted content to the second virtual machine.

20. The non-transitory device-readable medium of claim 19, wherein the first storage block comprises a memory page stored in a memory device.

* * * * *